United States Patent
Sydansk

[11] Patent Number: 5,129,457
[45] Date of Patent: Jul. 14, 1992

[54] ENHANCED LIQUID HYDROCARBON RECOVERY PROCESS

[75] Inventor: Robert D. Sydansk, Littleton, Colo.

[73] Assignee: Marathon Oil Company, Findlay, Ohio

[21] Appl. No.: 667,715

[22] Filed: Mar. 11, 1991

[51] Int. Cl.$^5$ .............................................. E21B 43/22
[52] U.S. Cl. ..................................... 166/274; 166/268; 166/309
[58] Field of Search .............. 166/268, 270, 272, 273, 166/274, 275, 294, 305.1

[56] References Cited

U.S. PATENT DOCUMENTS

| | | | |
|---|---|---|---|
| 3,530,940 | 9/1970 | Dauber et al. | 166/305 |
| 3,759,325 | 9/1973 | Gogarty | 166/273 |
| 4,044,833 | 8/1977 | Volz | 166/308 X |
| 4,300,634 | 11/1981 | Clampitt | 166/272 |
| 4,389,320 | 6/1983 | Clampitt | 252/8.551 |
| 4,673,038 | 6/1987 | Sandiford et al. | 166/270 |
| 4,676,316 | 6/1987 | Mitchell | 166/274 |
| 4,694,906 | 9/1987 | Hutchins et al. | 166/294 |
| 4,813,484 | 3/1989 | Hazlett | 166/270 |
| 4,911,241 | 3/1990 | Williamson et al. | 166/308 |
| 4,971,150 | 11/1990 | Sanchez | 166/245 |

OTHER PUBLICATIONS

H. Belkin et al., "Enhanced Oil Recovery by CO2 Foam Flooding", Dept. of Energy publication, DOE/MC/03259-6, Feb. 1980.

P. Persoff et al., "Aqueous Foams for Control of Gas Migration and Water Coning in Aquifer Gas Storage", Energy Sources, vol. 12, 1990.

R. L. Eson, "Field Demonstration of the Conventional Steam Drive Process with Ancillary Materials", U.S. Dept. of Energy Heavy Oil/EOR Contract. Mtg., Jul. 1981.

"Oil-Field Chemistry-Enhanced Recovery and Produciton Stimulation", ed. Borschardt et al., Third Chemical Congress of North America, Toronto, Canada, Jun. 5-11, 1988, pp. 32-33.

Primary Examiner—Stephen J. Novosad
Attorney, Agent, or Firm—Jack L. Hummel; Jack E. Ebel

[57] ABSTRACT

A polymer enhanced foam comprising a polymer selected from a synthetic polymer or a biopolymer, a surfactant, an aqueous solvent and a gas is injected into a fractured subterranean formation via a first well in fluid communication with the formation and preferentially enters fractures present in the formation. The injected polymer enhanced foam promotes the recovery of liquid hydrocarbons from said formation via the first well or a second well in fluid communication with the formation.

66 Claims, 2 Drawing Sheets

ENHANCED LIQUID HYDROCARBON RECOVERY PROCESS

BACKGROUND OF INVENTION

1. Technical Field

The present invention relates to a process for enhancing the recovery of liquid hydrocarbons from a subterranean formation which contains fractures, and more particularly, to such a process wherein a polymer enhanced foam is injected into a subterranean formation via a well and preferentially flows into and within fractures present in a subterranean formation.

2. Description of Related Art

Conventionally, liquid hydrocarbons are produced to the surface of the earth from a subterranean hydrocarbon-bearing formation via a well penetrating and in fluid communication with the formation. Usually, a plurality of wells are drilled and placed in fluid communication with the subterranean hydrocarbon-bearing formation to effectively produce liquid hydrocarbons from a particular subterranean reservoir. Approximately 5 to 25 volume percent of the liquid hydrocarbons originally present within a given reservoir in a subterranean formation usually can be produced by the natural energy of the reservoir, i.e., by primary production. Accordingly, secondary and tertiary recovery processes have usually been employed to produce additional quantities of original hydrocarbons in place from a subterranean formation once primary production becomes uneconomical or ceases. Such secondary recovery processes include processes involving the injection of a drive fluid, such as water, polymer thickened water, steam, foam or a gas, for example $CO_2$, via wells designated as injection wells into the formation to drive liquid hydrocarbons to proximate wells designated for production of hydrocarbons to the surface. Successful secondary recovery processes may result in the recovery of greater than about 25 volume percent of the original liquid hydrocarbons in place within a given reservoir in a subterranean formation. Tertiary recovery processes have been utilized to recover an additional incremental amount of the original liquid hydrocarbons in place in a subterranean formation by altering the properties of reservoir fluids, e.g., altering interfacial tension, and thereby improving the displacement efficiency of liquid hydrocarbons from the formation. Examples of tertiary recovery processes include micellar and surfactant flooding processes. Tertiary recovery processes may also include processes which involve the injection of a thermal drive fluid, such as steam, or a gas, such as carbon dioxide, which at high pressures is miscible with liquid hydrocarbons. Such tertiary recovery processes can be applied to a given subterranean formation before or after a secondary recovery process has been operated to its economic limit, i.e., the revenue from the sale of hydrocarbons produced as a result of the process is less than the operating expense of the process per se.

One problem often encountered in conducting secondary or tertiary recovery processes is poor conformance, and thus sweep efficiency, of drive fluid injected into a subterranean formation during a secondary or tertiary process. Such poor conformance of drive fluid may occur where the matrix of the formation exhibits a lack of homogeneity. For example, layering of subterranean zones, strata, or beds of varying permeabilities, may occur in the near, intermediate and/or far well bore environment of a formation. Drive fluid injected into the formation via a well in fluid communication with the formation tends to preferentially channel or finger into and within high permeability streaks in the matrix and thus may result in extremely poor conformance and flow profiles of the drive fluid and reduced production and recovery of liquid hydrocarbons. Further exemplary, subterranean zones, strata, or beds possessing relatively high permeability may be vertically juxtaposed to subterranean zones, strata, or beds of relatively low permeability. Fluid injected into the subterranean hydrocarbon-bearing formation will preferentially flow through the zones, strata, or beds of relatively high permeability resulting in a relatively high liquid hydrocarbon content in the remaining zones of relatively low permeability.

Selective placement of a plugging or mobility reducing material in the regions of a subterranean formation exhibiting relatively high permeability has been suggested to improve conformance and flow profiles of drive fluids injected into the formation. More specifically, several prior art processes have been proposed to improve conformance and flow profiles of drive fluids injected into a subterranean formation by placing a foam in the relatively high permeability regions of the formation matrix. U.S. Pat. No. 4,676,316 to Mitchell discloses sequentially injecting an aqueous solution of water-soluble polymer and surfactant followed by a soluble or miscible gas into the matrix of a subterranean hydrocarbon-bearing reservoir. The polymer is selected from the group consisting of naturally occurring biopolymers, such as polysaccharides, and synthetic polymers, such as polyacrylamides, and is incorporated into the aqueous solution in an amount of from about 250 ppm to about 4,000 ppm. The surfactant which is a foam former and is chemically and thermally stable under reservoir conditions is added to the aqueous solution in an amount of from about 0.05 percent to about 2 percent. The gas is a soluble gas or a miscible gas which is injected into the formation under a pressure which is sufficient to effect miscibility with hydrocarbon deposits. The aqueous solution is introduced as a slug having a volume which is from about 0.05 pore volume to about 1 pore volume of the portion of the reservoir affected by the pattern. Thereafter, a drive fluid may be used to displace oil and the previously injected fluids towards production well(s). This process impedes the frontal flow of a flood in a subterranean reservoir in higher permeability regions thereof. U.S. Pat. No. 4,813,484 to Hazlett discloses injecting an aqueous solution containing a surfactant, a decomposable chemical blowing agent, and a water-thickening amount of a water-soluble polymer or gel into the more permeable zone(s) of a subterranean formation. The formation temperature, coinjected activators, reservoir fluids, or formation mineralogy causes the blowing agent to decompose and generate a gas. This gas forms bubbles which close pores in the more permeable zone(s) of a formation causing a subsequently injected drive fluid to be directed into less permeable zone(s). The injection rate of the aqueous solution must be sufficient to allow fluid placement into the more permeable zone(s). U.S. Pat. No. 3,530,940 to Dauber et al. discloses the sequential injecting into a subterranean formation an aqueous solution of a water-soluble film-forming polymer, such as polyvinyl alcohol or a polyvinyl pyrrolidone, and a gas to form foam within the pores of the formation thereby plugging the formation.

Use of foams to plug more permeable zones of a subterranean formation matrix have not proved to be completely satisfactory. Since the viscosity of most foams is often too high to permit effective injection within the high permeability zone, placement of such foams within the high permeability zones in the matrix of the subterranean formation usually requires the generation of the foam in situ within the high permeability zone. Accordingly, the gaseous and liquid components of a foam must be introduced into the formation matrix separately or sequentially. However, the mixing and resultant foam formation achieved by contacting an aqueous solution and a gas within the high permeability zones of a subterranean formation matrix is not as complete, uniform, or efficient as that which can be achieved prior to entry into the formation.

Further, poor conformance of a drive fluid often occurs in fractured subterranean formations since the drive fluid preferentially flows through the relatively high permeability fractures thereby bypassing the formation matrix. Thus, liquid hydrocarbons present within the formation matrix are not efficiently displaced by the drive fluid. Especially problematic is the poor conformance of drive gases which are injected into a naturally fractured subterranean formation.

Another problem associated with secondary recovery processes may be encountered in many fractured subterranean formations in which the fractures contain relatively viscous liquid hydrocarbon. After an aqueous drive fluid, such as water, which is initially injected into a vertically fractured subterranean formation breaks through to a production well, the volume percentage of viscous liquid hydrocarbons remaining in place in substantially vertically oriented and relatively high permeability fractures present within the subterranean formation often is significant, e.g., 5-70% or more. Continued injection of an aqueous drive fluid will only sweep a small amount of the remaining viscous liquid hydrocarbons from these fractures since the relatively high density and low viscosity of the aqueous drive fluid will often cause the drive fluid to flow under and thereby inefficiently displace the viscous liquid hydrocarbons present in the vertical fractures. Thus, upon breakthrough of the aqueous drive fluid at a production well, a water-soluble polymer, such as a polyacrylamide having a molecular weight of about 11,000,000, may be added to the aqueous drive fluid in an amount sufficient to significantly increase the viscosity of the drive fluid, for example 500 ppm. However, injection of such thickened drive fluids may not result in a substantial increase in the recovery efficiency of viscous liquid hydrocarbons residing in vertical fractures. The relatively high density of thickened drive fluids causes the drive fluid to tend to flow underneath and thus inefficiently displace unrecovered liquid hydrocarbons present in vertical fractures within a subterranean formation. Attempts to obtain acceptable liquid hydrocarbon recovery levels by further increasing polymer concentration in thickened drive fluids to increase fluid viscosity and thereby obtaining more favorable fluid:oil mobility ratios have proved to be uneconomical and inefficient. Thus, a need exists for a process, utilized alone or in combination with secondary or tertiary recovery processes, which can effectively and economically recover liquid hydrocarbons from a fractured subterranean formation.

Accordingly, it is an object of the present invention to provide an efficient and economic process for recovering liquid hydrocarbons present in subterranean fractures.

It is also an object of the present invention to provide a process for increasing the recovery liquid hydrocarbons present in fractures in a vertically fractured subterranean formation which are in fluid communication with an underlying aquifer.

Another object of the present invention is to provide a process for recovering liquid hydrocarbons present in a fractured subterranean formation wherein a drive fluid which is subsequently injected into the formation is caused to preferentially flow into the formation matrix.

Another object of the present invention to provide a process for increasing the recovery of liquid hydrocarbons from a vertically fractured subterranean formation which utilizes imbibition of water into the formation matrix as a hydrocarbon recovery mechanism.

A further object of the present invention to provide a process for improving the flow profiles of a drive fluid injected into a subterranean formation via a well in fluid communication therewith.

A further object of the present invention is to provide a relatively inexpensive yet effective mobility control fluid for flooding of fractures present in a fractured subterranean formation.

A still further object of the present invention is to provide a process for recovering liquid hydrocarbons from a fractured subterranean formation in which a fully formed foam is injected into the formation thereby obviating the need for sequential injection of foam-forming solutions.

It is also an object of the present invention to utilize non-hazardous components to form a polymer enhanced foam.

It is another object of the present invention to provide a polymer enhanced foam for the processes described herein which is exceptionally stable, has a relatively high viscosity and is relatively insensitive to surfactant chemistry.

It is another object of the present invention to form a polymer enhanced foam without using film forming polymers which are relatively expensive and/or difficult to dissolve.

SUMMARY OF INVENTION

To achieve the foregoing and other objects, and in accordance with the purposes of the present invention, as embodied and broadly described herein, the process of the present invention comprises injecting into a fractured subterranean formation, a polymer enhanced foam comprising a polymer selected from a synthetic polymer or a biopolymer, a surfactant, an aqueous solvent and a gas. The polymer enhanced foam preferentially enters and flows within fractures present in the formation. Liquid hydrocarbons are recovered from said formation.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 1:
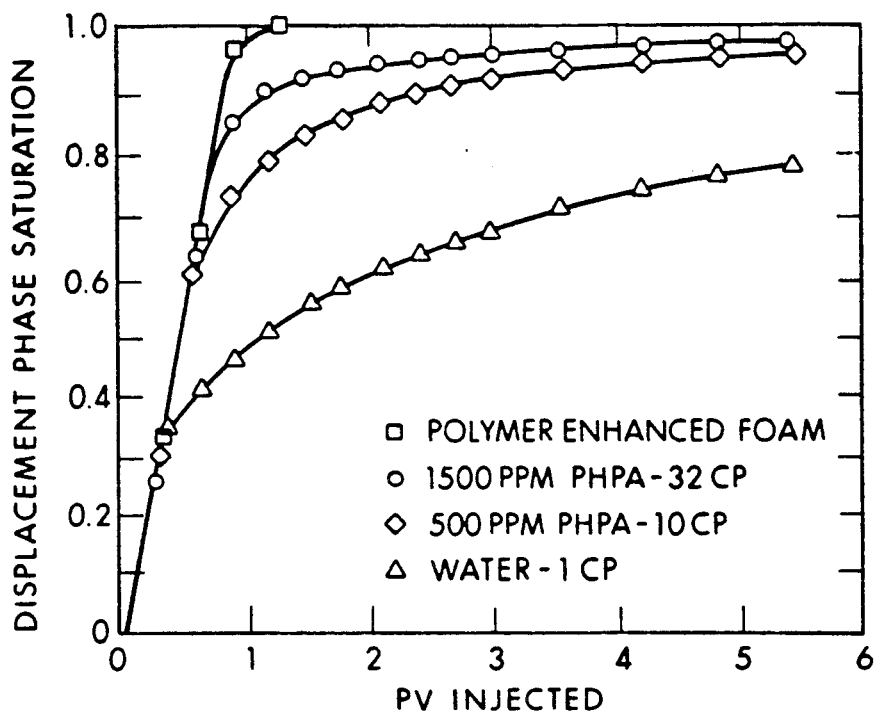
FIG. 1 is a graph illustrating the displacement phase saturation as a function of the pore volume(s) of fluid injection into an ideal fracture model.

Throughout the specification, the present invention is described by using several terms which are defined as follows. A subterranean formation denotes a gas and/or liquid hydrocarbon-containing subterranean formation and includes two general regions, "matrix" and "anomalies." An "anomaly" is a volume or void space in the formation having very high permeability relative to the matrix. It is inclusive of terms such as fractures, fracture networks, joints, cracks, fissures, vugs, voids, solution channels, caverns, washouts, cavities, etc. The "matrix" is substantially the remainder of the formation volume characterized as essentially continuous, sedimentary reservoir material free of anomalies and often being competent and having a relatively low permeability. "A fractured subterranean formation" denotes a subterranean formation having fractures, joints, cracks, fissures and/or networks thereof and is inclusive of both vertically and horizontally fractured formations. A "vertically fractured subterranean formation" denotes a subterranean formation having fractures, joints, cracks, fissures and/or networks thereof which possess a generally vertical orientation, i.e., having a deviation from true vertical not greater than 45°. As a general rule, a vertically fractured subterranean formation is usually encountered at a subsurface depth of greater than about 300 meters. At less than about 300 meters, most subterranean formations contain fractures having a generally horizontal orientation. As most hydrocarbon-bearing formations are encountered at depths greater than 300 meters, fractures contained in such formations usually possess a generally vertical orientation. "Fractures" is inclusive of fracture(s), joint(s), crack(s), fissure(s) and/or network(s) thereof. "Foam quality" denotes the volume percentage of gas phase in a given foam. "Polymer enhanced foam" denotes a foam utilized in the process of the present invention which comprises an aqueous phase having a surfactant and a water-soluble, viscosity-enhancing polymer incorporated therein. "Well" and "well bore" are used interchangeably to denote a well or well bore at least partially in fluid communication with a fractured subterranean formation via fractures, cracks, fissures and/or networks naturally present in the formation and/or hydraulically created in the formation. "Fluid" is inclusive of a gas, a liquid and/or mixtures thereof.

In accordance with the present invention, a polymer enhanced foam is formed by any suitable, conventional foam generation technique as will be evident to a skilled artisan. The quality of the polymer enhanced foam injected into a subterranean formation should vary from about 50 vol % to about 99.5 vol %, more preferably from about 60 vol % to about 98 vol %, and most preferably from about 70 vol % to about 97 vol %. The foam may be generated downhole prior to injection into the formation by simultaneously injecting separate streams of the aqueous solution and the gas via tubing positioned in a well bore and mixing these streams in the well bore by means of, for example, a static mixer or other conventional foam generating apparatus positioned within the tubing. Preferably however, these streams are mixed above ground to form a suitable foam prior to injection into a well.

The polymer employed in the polymer enhanced foam of the present invention may be any high molecular weight, water-soluble, viscosity-enhancing synthetic polymer or biopolymer. Biopolymers useful in the present invention include polysaccharides and modified polysaccharides. Exemplary biopolymers are xanthan gum, guar gum, succinoglycan, scleroglucan, polyvinylsaccharides, carboxymethylcellulose, o-carboxychitosans, hydroxyethylcellulose, hydroxypropylcellulose, and modified starches. Useful synthetic polymers include acrylamide polymers, such as polyacrylamide, partially hydrolyzed polyacrylamide, acrylamide copolymers, terpolymers containing acrylamide, a second species, and a third species, and tetrapolymers containing acrylamide, acrylate, a third species and a fourth species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having greater than 1%, but not 100%, of the acrylamide groups chemically converted to the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al which is incorporated herein by reference. The average molecular weight of a polymer employed in a polymer enhanced foam in accordance with the present invention is in the range of about 10,000 to about 50,000,000 and preferably about 250,000 to about 20,000,000, and most preferably about 1,000,000 to about 15,000,000. The polymer concentration in the polymer enhanced foam of the present invention is from about 100 ppm to about 80,000 ppm, preferably from about 500 ppm to about 12,000 ppm, and most preferably from about 2,000 ppm to about 10,000 ppm. The incorporated polymer imparts stability to the polymer enhanced foam, especially in the presence of liquid hydrocarbons, throughout the application of the process of the present invention to a fractured subterranean formation. The polymer also increases the performance of the polymer enhanced foam, for example, by increasing the viscosity and the structural strength of the polymer enhanced foam.

The surfactant employed in the polymer enhanced foam of the present invention may be any water-soluble, frothing surfactant suitable for a subterranean oil recovery use and compatible for use with the specific polymer selected as will be evident to the skilled artisan. The surfactant may be anionic, cationic or nonionic. Preferably, the surfactant can be selected from ethoxylated alcohols, ethoxylated sulfates, refined sulfonates, petroleum sulfonates and alpha olefin sulfonates. The concentration of surfactant employed in the aqueous solution into which a gas is incorporated to form the polymer enhanced foam of the present invention is from about 20 ppm to about 50,000 ppm, preferably from about 50 ppm to about 20,000 ppm, and most preferably from about 100 ppm to about 10,000 ppm. In general, the manner in which the polymer enhanced foam functions in accordance with the process of the present invention as hereinafter described is relatively insensitive to the particular surfactant employed therein.

The aqueous solvent of the aqueous solution into which a gas is incorporated to form the polymer enhanced foam of the present invention may be fresh water or a brine having a total dissolved solids concentration up to the solubility limit of the solids in water. Preferably, the aqueous solvent is water injected into or produced from a subterranean formation. Examples of gases which are useful in forming the polymer enhanced foam of the present invention include nitrogen, air, carbon dioxide, flue gas, produced gas and natural gas.

The polymer enhanced foam of the present invention is injected into a subterranean formation via the well bore under a pressure sufficient to cause the foam to enter the formation but usually less than the parting pressure of the formation. The pH of the aqueous phase of the polymer enhanced foam is usually about neutral, i.e., a pH of about 6 to about 8. However, when not about neutral, the pH of the aqueous phase preferably may be adjusted in accordance with conventional field operation procedure to about neutrality prior to injection. Such pH adjustments may be made in any suitable manner as will be evident to the skilled artisan. The polymer enhanced foam preferentially enters and flows within the fractures of the formation due, in part, to the relatively high viscosity thereof. Foam may be injected until breakthrough of the foam at a production well at which time injection of a drive fluid via the injection well will ordinarily begin. Preferably, a predetermined volume of polymer enhanced foam which is less than that required for such breakthrough will be utilized. The volume of foam injected into a subterranean reservoir will range from about 0.3 to about 2,600 or greater reservoir cubic meters per vertical meter of reservoir interval to be treated and preferably from about 0.6 to about 520 reservoir cubic meters per vertical meter of reservoir interval to be treated. The polymer enhanced foam utilized in the process of the present invention is preferably stable over a period of time of at least about 24 hours. Thus, the polymer enhanced foam is sufficiently stable and viscous to displace liquid hydrocarbons present within fractures in a subterranean formation but will eventually break down to gas and a surfactant and polymer containing aqueous solution within a predetermined period of time in order to permit removal thereof from the fractures by a subsequently injected foam or other drive fluid. The stability of such polymer enhanced foam can be predetermined by varying surfactant chemistry and composition, polymer chemistry and concentration, brine chemistry and foam quality. The gas, surfactant and polymer resulting from foam breakdown in the fractures can be enhanced oil recovery agents which are beneficial and not deleterious to the recovery of liquid hydrocarbons from the formation and which can be readily removed from fractures by means of a subsequent injected drive fluid, if so desired.

The process of the present invention can be employed to recover liquid hydrocarbons from most fractured subterranean formations and is not highly sensitive to any particular formation mineralogy or lithology. The process can be employed per se as a hydrocarbon recovery process for use in fractured subterranean formations but is usually employed as a sweep improvement process in conjunction with a secondary recovery operation, such as a water flood or a polymer flood, or a tertiary recovery operation, for example, an alkaline flood or $CO_2$ flood. The high apparent in situ viscosity of the polymer enhanced foam results in a more complete sweep of fractures in a fractured subterranean formation and less channeling or fingering of the polymer enhanced foam than would occur with any such flood alone.

As mentioned above, the process of the present invention may be utilized in conjunction with an enhanced oil recovery process which utilizes a drive fluid to displace liquid hydrocarbons from the matrix of a fractured subterranean formation. A drive fluid, for example, a gas such as carbon dioxide or steam, or a liquid, such as water, which is injected into a fractured subterranean formation will tend to preferentially flow or channel through the fractures thereby bypassing hydrocarbons present in the formation matrix. As previously discussed, a polymer enhanced foam which is injected into a fractured subterranean formation in accordance with the process of the present invention preferentially sweeps, and therefore, occupies at least a portion of the subterranean fractures. Further, the high apparent in situ viscosity of the polymer enhanced foam will cause an increase in the differential injection pressure encountered in the fractures by a subsequently injected drive fluid thereby tending to divert the flow path of such fluid from the fractures into the formation matrix. Thus, in accordance with one embodiment of the present invention, a polymer enhanced foam is injected into and occupies at least a portion of the fractures of a fractured subterranean formation. Thereafter, a drive gas or liquid is injected into the fractured subterranean formation via the same or different well(s). Suitable drive liquids include water, brine, an aqueous solution containing a polymer, an aqueous alkaline solution, an aqueous solution containing a surfactant, a micellar solution and mixtures thereof. Upon encountering the polymer enhanced foam within the fractures, the relatively high viscosity of the polymer enhanced foam present in a portion of the subterranean fractures provides an increased pressure differential thereby diverting at least a portion of the drive gas or liquid into the formation matrix which results in an improved sweep efficiency of liquid hydrocarbons from the formation matrix and/or fractures by the drive gas or liquid. Accordingly, in those instances where it is desirable to utilize the mobility control properties of a polymer enhanced foam in the process of the present invention, the stability of the foam can be increased preferably by increasing the concentration of polymer in the foam. Alternatively, the stability of the foam may be increased by increasing the foam quality to ensure mobility control during drive fluid injection.

In one embodiment, the process of the present invention is applied to a vertically fractured subterranean formation containing viscous liquid hydrocarbons to more efficiently sweep liquid hydrocarbons from fractures present in the formation. This process is especially applicable when the viscosity ratio between hydrocarbons and water present in a formation is from about 2:1 to about 200:1 or more and preferably at least about 10:1. As previously discussed, water injected into a vertically fractured subterranean formation during a conventional waterflooding process inefficiently displaces liquid hydrocarbons present in given high permeability fractures since water tends to flow underneath a substantial portion of liquid hydrocarbons present in the fractures due to the higher density and lower viscosity of water. In accordance with the present invention, a polymer enhanced foam is injected into a vertically fractured subterranean formation and preferentially enters and flows within the fractures contained therein. The relatively low density, for example, 0.005 to 0.6 gm/cc, and the relatively high apparent in situ viscosities, for example, 5 to 10,000 cp or more of the polymer enhanced form, causes the foam to preferentially sweep the upper portions of fractures within a vertically fractured subterranean formation thereby resulting in increased liquid hydrocarbon recovery from these fractures. In addition, this embodiment of the present invention is useful where the vertical fractures are in fluid communication with are underlying aquifer. Injection of water or polymer thickened water as a drive fluid results in a significant loss of drive water to the aquifer since the relatively high density of the drive water causes flow through the lower portions of the fractures and often into the aquifer. As just mentioned, relatively low density and high apparent in situ viscosity of the polymer enhanced foam causes the foam to sweep the upper portions of the fractures thereby substantially reducing loss of this drive fluid to the underlying aquifer.

In another embodiment, a polymer enhanced foam is injected into a vertically fractured subterranean formation via a well in fluid communication with the formation and preferentially flows within and preferentially occupies the upper portions of the fractures contained therein. Thereafter, a drive gas is injected into the vertically fractured subterranean formation via the same or a different well. Upon encountering the polymer enhanced foam present in the upper portions of the fractures, the relatively high apparent in situ viscosity of the polymer enhanced foam diverts at least a portion of the drive gas into the lower portions of the vertical fractures thereby causing the drive gas to more effectively sweep liquid hydrocarbons from the lower portions of the vertical fractures. As previously discussed, a portion of the drive gas will be diverted by the polymer enhanced foam into the formation matrix resulting in a more effective sweep by the drive gas of liquid hydrocarbons from the formation matrix.

During waterflooding, imbibition of water from fractures in a subterranean formation into the formation matrix to displace liquid hydrocarbons from the matrix and into the fractures has been recognized as a significant mechanism for oil recovery from many fractured subterranean formations. However, water or polymer thickened water which is normally used to displace liquid hydrocarbons from fractures in subterranean formations tends to flow underneath a significant volume of liquid hydrocarbons present in fractures, especially viscous liquid hydrocarbons. Thus, water is prevented from imbibing into the formation matrix in those portions of the fractures which remain filled with liquid hydrocarbons. Due in part to the low density of polymer enhanced foams, the process of the present invention results in a more uniform and complete sweep of liquid hydrocarbons, especially gravity segregated liquid hydrocarbons, from fractures in a subterranean formation. Injection of an aqueous drive fluid subsequent to the application of the process of the present invention will permit additional incremental liquid hydrocarbons to be recovered from the formation matrix adjacent such fractures by imbibition of the aqueous drive fluid into the formation matrix from those portions of the fractures previously occupied by liquid hydrocarbons. Accordingly, the process of the present invention utilizing a polymer enhanced foam may be repeated at least once in order to obtain additional recovery of incremental liquid hydrocarbons present in formation fractures due to increased imbibition of water into the formation matrix. As a general guide, the process of the present invention may be repeated as often as is economically and operationally feasible.

The following examples demonstrate the practice and utility of the present invention, but are not to be construed as limiting the scope thereof.

EXAMPLE 1

Three separate foam samples are generated by coinjecting nitrogen gas and an aqueous solution having a pH of 7-8 and containing an ethoxylated sulfate surfactant ($C_{12-15}$—$(EO)_3$—$SO_3Na$) manufactured by Shell Chemical Company under the trade name Enerdet 1215-3S into a 15.2 cm×1.1 cm, 20-30 mesh, Ottawa test sand sandpack at a constant pressure differential of 0.17 MPa. Sample #3 is generated utilizing an aqueous solution as described above which also contains a 2.9 mol % hydrolyzed polyacrylamide (PHPA) having a molecular weight of 11,000,000. The sandpack and flood temperature is about 22° C. The nitrogen and aqueous solution mix in the sandpack to form a foam which is collected as the sandpack effluent in 100 ml stoppered graduated cylinders. Characteristics of each collected foam sample are listed in Table 1 below. The PHPA and surfactant concentrations are expressed in Table 1 as ppm which is based solely on concentration within the aqueous solution.

TABLE 1

| Foam Sample | #1 | #2 | #3 |
|---|---|---|---|
| PHPA concentration (ppm) | 7,000 | — | — |
| Surfactant concentration (ppm) | 1,000 | 1,000 | 5,000 |
| Foam Quality (%) | 63 | 68 | 75 |
| Apparent In-Situ Viscosity (cp) | 89 | 2.2 | 2.5 |
| Flood Rate (ml/min) | 5.3 | 212 | 192 |
| Frontal Advance Rate (m/D) | 210 | 8,300 | 7,300 |

The position of the air/foam interface in the graduated cylinders is visually determined at predetermined intervals for each foam sample to ascertain the amount of nitrogen which escapes from the foam. The results are listed in Table 2.

TABLE 2

| | Position of Air/Foam Interface (ml) | | |
|---|---|---|---|
| Time | Foam Sample #1 | Foam Sample #2 | Foam Sample #3 |
| 5 min. | 100 | 100 | 100 |
| 10 min. | 100 | 100 | 100 |
| 30 min. | 100 | 98 | 100 |
| 1.0 hr. | 100 | 97 | 97 |
| 2.0 hr. | 100 | 87 | 87 |
| 3.0 hr. | 100 | 85 | 85 |
| 4.0 hr. | 100 | 83 | 83 |
| 5.0 hr. | 100 | 80 | 80 |
| 17.0 hr. | 99 | 32 | 25 |
| 24.0 hr. | 99 | 32 | 25 |

In a similar manner, the position of the water/foam interface within the 100 ml graduated cylinder is visually determined at the same predetermined intervals for each foam sample to ascertain the amount of water which drains from the foam. The results are tabulated in Table 3.

TABLE 3

| Time | Position of Water/Foam Interface (ml) | | |
|---|---|---|---|
| | Foam Sample #1 | Foam Sample #2 | Foam Sample #3 |
| 5 min. | None | 22 | 20 |
| 10 min. | None | 28 | 25 |
| 30 min. | None | 31 | 25 |
| 1.0 hr. | None | 31 | 25 |
| 2.0 hr. | None | 32 | 25 |
| 3.0 hr. | 3 | 32 | 25 |
| 4.0 hr. | 4 | 32 | 25 |
| 5.0 hr. | 5 | 32 | 25 |
| 17.0 hr. | 37 | 32 | 25 |
| 24.0 hr. | 37 | 32 | 25 |

By subtracting the water/foam interface position from the air/foam interface position, the foam volume for each foam sample over the predetermined intervals is determined and reported in Table 4.

TABLE 4

| Time | Foam Volume (ml) | | |
|---|---|---|---|
| | Foam Sample #1 | Foam Sample #2 | Foam Sample #3 |
| 5 min. | 100 | 78 | 80 |
| 10 min. | 100 | 72 | 75 |
| 30 min. | 100 | 67 | 73 |
| 1.0 min. | 100 | 66 | 72 |
| 2.0 hr. | 100 | 55 | 62 |
| 3.0 hr. | 97 | 53 | 60 |
| 4.0 hr. | 96 | 51 | 58 |
| 5.0 hr. | 95 | 48 | 55 |
| 17.0 hr. | 62 | 0 | 0 |
| 24.0 hr. | 62 | 0 | 0 |

As illustrated by these results, foam Sample #1 which contains 7,000 ppm of a 2.9% hydrolyzed polyacrylamide maintains 62% of its original volume after 24 hours while foam Samples #2 and #3, which do not contain any polymer, completely collapse after only 17 hours of aging. The polymer enhanced foam Sample #1 has an in situ apparent average viscosity of about 89 centipoise (cp) in the test sandpack while foam Samples #2 and #3 have an apparent average in situ viscosity of only about 2 cp. As will be apparent to the skilled artisan, foam stability observed in such experiments probably will greatly increase in the relatively confined porous media of a subterranean formation (especially at 100% foam saturation).

EXAMPLE 2

An ideal fracture model consisting of two parallel glass plates having the space between the top and bottom edges being sealed is utilized to conduct a series of fracture model floods. The plates are spaced at a uniform width of about 0.127 cm and fluids are injected into and produced from a series of ports at either side of the model. The volume of fluid injected during the fracture model floods is about five pore volumes, i.e., five fracture volumes. Initially the fracture, i.e., the volume between the two parallel glass plates, is filled with a 25 cp refined oil. The total differential pressure applied across the approximately 0.46 m length model is 0.002 MPa, i.e., 0.002 MPa from the top of the inlet manifold to the top of the outlet manifold. Of the four separate model floods which are conducted, three of these utilize, respectively, water having a viscosity of 1 cp, an aqueous solution of a brine having a viscosity of 10 cp and containing 5,800 ppm total dissolved solids, 640 ppm hardness and 500 ppm of a 30% hydrolyzed, 11,000,000 molecular weight polyacrylamide and an aqueous solution of a brine having a viscosity of 32 cp and containing 5,800 ppm total dissolved solids, 640 ppm hardness and 1,500 ppm of a 30 mol % hydrolyzed, 11,000,000 molecular weight polyacrylamide. The fourth model flood utilized a nitrogen polymer enhanced foam where the aqueous phase contains 7,000 ppm of a 30% hydrolyzed, 11,000,000 molecular weight polyacrylamide and 2,000 ppm of an alpha olefin sulfonate surfactant manufactured by Stephan Chemical Co. under the trade name Stepanflo-20 in a synthetic oil field produced brine containing 5,800 ppm total dissolved solids and 640 ppm hardness. The polymer enhanced foam is of a 91% foam quality. The pH of the aqueous phase of the polymer enhanced foam is 7-8.

The results of these fracture model floods are illustrated in FIG. 1. Injection of water into the fracture model results in an early breakthrough and injection of over five pore volume of water leaves approximately 32% of the original 25 cp refined oil in place. Injection of over 5 pore volumes of the 500 ppm 30 mol % partially hydrolyzed polyacrylamide aqueous solution results in improved oil recoveries while an increase in partially hydrolyzed polyacrylamide concentration to 1,500 ppm results in further improved oil recoveries but at a substantially higher cost. In contrast, the injection of the polymer enhanced foam of the present invention results in recovery of essentially all of the oil, i.e., about 97 vol %, from the fracture model after only one pore volume of polymer enhanced foam is injected. Such results are due in part to the low density of the polymer enhanced foam of the present invention. Any significant breakthrough of polymer enhanced foam does not occur unitl 0.82 pore volume of oil is produced. These results illustrate the increased efficiency in producing oil from fractures obtained by utilizing a polymer enhanced foam.

EXAMPLE 3

Polymer enhanced foam samples of varying quality are generated by coinjecting nitrogen gas and an aqueous solution at a pH of 10 and containing 7,000 ppm of a 30 mol % hydrolyzed, 11,000,000 molecular weight polyacrylamide and 2,000 ppm of an alpha olefin sulfonate surfactant manufactured by Stephan Chemical Co. under the trade name Stepanflo-20 into a 30.5 cm long, 150,000 md permeability, Ottawa test sand sandpack at a constant pressure differential of 0.34 MPa. The floods are performed at about 3.1 MPa back pressure and at ambient temperature of about 22° C. The flooding advance rate is about 150–240 m/day. The foam quality and the average apparent in situ viscosity are set forth below in Table 5. The average apparent in situ viscosity is calculated from the ratios of brine mobility to polymer enhanced foam mobility as measured.

TABLE 5

| Fluid | Foam Quality As Injected (Vol. % N$_2$) | Apparent In-Situ Viscosity (cp) |
|---|---|---|
| Polymer/Surfactant Solution | 0 | 150 |
| PEF | 57 | 200 |
| PEF | 63 | 190 |
| PEF | 74 | 210 |
| PEF | 80 | 230 |
| PEF | 85 | 230 |
| PEF | 89 | 240 |

TABLE 5-continued

| Fluid | Foam Quality As Injected (Vol. % N$_2$) | Apparent In-Situ Viscosity (cp) |
|---|---|---|
| PEF | 89 | 240 |
| PEF | 93 | 240 |

These results indicate that the average apparent in situ viscosity of the polymer enhanced foam of the present invention is slightly greater than the apparent in situ viscosity of the aqueous solution alone containing partially hydrolyzed polyacrylamide and an alpha olefin sulfonate surfactant. Surprisingly, the average apparent in situ viscosity of the polymer enhanced foam of the present invention appears to increase slightly as the volume percentage of gas, i.e., foam quality, increases. Thus, the viscosity of the polymer enhanced foams utilized in the process of the present invention is relatively insensitive to foam quality. Accordingly, the performance of this polymer enhanced foam is maintained as the cost of the foam is greatly reduced by diluting the relatively expensive aqueous solution with relatively inexpensive gas to generate a polymer enhanced foam. As such, it will be readily apparent to the skilled artisan that the polymer enhanced foam of the present invention provides an extremely economical alternative to conventional fluids injected into a fractured subterranean formation while resulting in increased efficiency of oil recovered from fractures and matrix present in subterranean formations.

EXAMPLE 4

Figure 2:
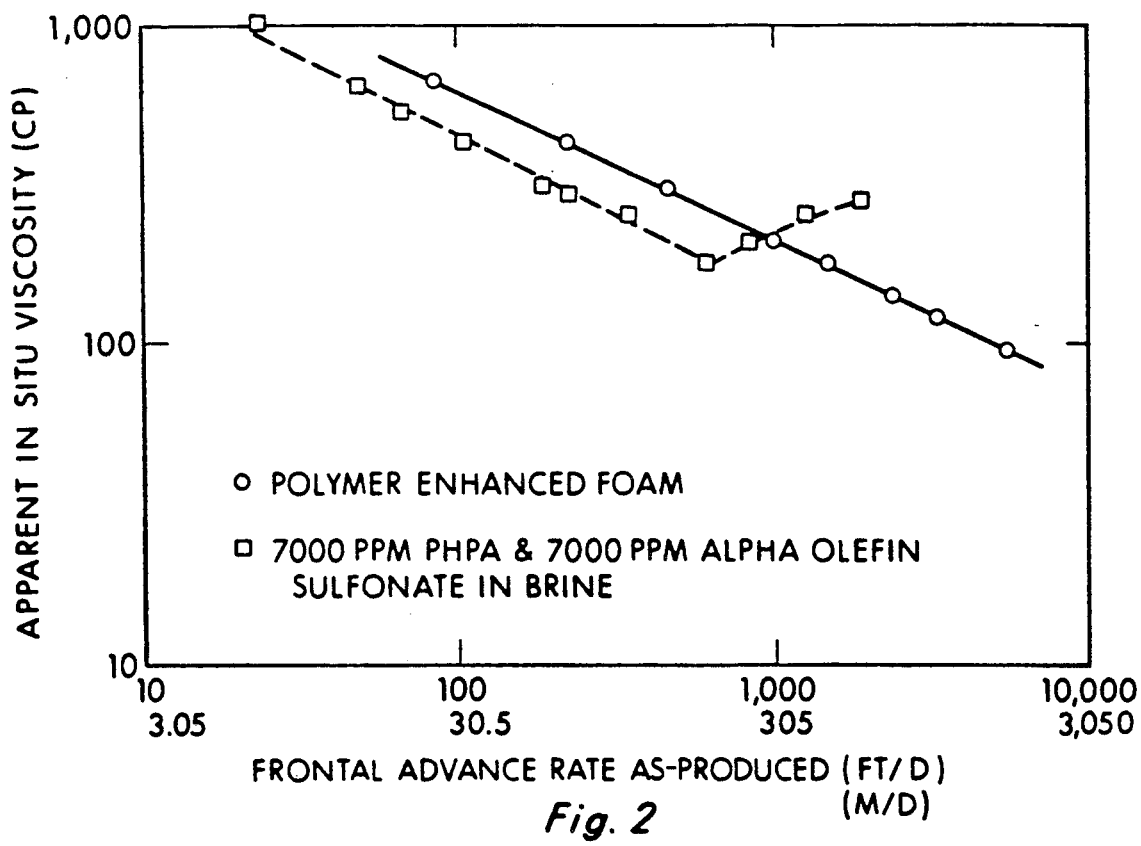
FIG. 2 is a logarithmic graph illustrating the average apparent in situ viscosity of both a polymer enhanced foam utilized in the process of the present invention and a polymer/surfactant solution as a function of the frontal advance rate of the foam or solution, respectively, through a high permeability sandpack.

Nitrogen gas and an aqueous solution at a pH of 10 and containing 7,000 ppm of a 30 mol % hydrolyzed, 11,000,000 molecular weight polyacrylamide and 2,000 ppm of an alpha olefin sulfonate surfactant manufactured by Stephan Chemical Co. under the trade name of Stepanflo-20 are coinjected into a 30.5 cm long, 20–30 mesh Ottawa test sandpack having a permeability of 170,000 md. The single sandpack of this flooding experiment acts as both a foam-generating and a test sandpack. The resultant polymer enhanced foam is flooded at a series of differential pressures ranging from 0.14 to 1.4 MPa. This range of differential pressures promoted corresponding frontal advance rates ranging from about 25 to about 1,700 m/day. The foam quality is held between 77% and 89% during the experiment. The results of this experiment are illustrated in FIG. 2. These results indicate that the polymer enhanced foam as utilized in the present invention possess at least as great as and possibly greater viscosity and mobility reduction as a corresponding aqueous solution of polymer and surfactant per se. This is surprising in light of the fact that the polymer enhanced foam of the present invention and example is greatly diluted with an inexpensive gas, i.e., nitrogen.

The results set forth in FIG. 2 further illustrate that at high frontal advance rates which correspond to the near injection well bore environment, the apparent in situ viscosity of the polymer enhanced foams of the present invention are sufficiently low to facilitate injectivity from a well into a fractured subterranean formation. Such results also indicate that the polymer enhanced foams of the present invention exhibit relatively high apparent in situ viscosity at low frontal advance rates which correspond to locations within subterranean fractures which are a significant distance from the well bore and thus function as relatively good mobility control and diverting agents in the fractures at such locations. Thus, the flow profile of any drive fluid which is subsequently injected into the formation will be improved. FIG. 2 also indicates that an aqueous solution alone containing a polymer and a surfactant will be more difficult to inject into a fractured subterranean formation than a corresponding polymer enhanced foam due to the relatively increased apparent in situ viscosity exhibited by the aqueous solution at high frontal advance rates.

EXAMPLE 5

Nitrogen gas and an aqueous solution at a pH of 10 and containing 7,000 ppm of a 30 mol % hydrolyzed, 11,000,000 molecular weight polyacrylamide and 2,000 ppm of an alpha olefin sulfonate surfactant manufactured by Stephan Chemical Co. under the trade name of Stepanflo-20 are coinjected into a 15.2 cm long, 20–30 mesh Ottawa test sand foam generating sandpack having a permeability of 130,000 md to generate a polymer enhanced foam which is then injected into a 30.5 cm 20–30 mesh Ottawa test sand sandpack having a permeability of 120,000 md. The polymer enhanced foam is flooded through the test sandpack at a series of differential pressures ranging from 0.06 to 1.21 MPa This range of differential pressures promoted corresponding frontal advance rates ranging from about 0.09 to about 1,700 m/day. The foam quality is held between 81% and 89% during the experiment. The results of this experiment are illustrated in FIG. 3.

As illustrated by these results, the apparent in situ viscosity of the power law, shear thinning polymer enhanced foam increases dramatically at very low frontal advance rates which are encountered within subterranean fractures at a significant distance from a well bore via which the polymer enhanced foam is injected. Such dramatically increased apparent in situ viscosities, e.g., viscosities approaching 100,000 cp, effectively serve to permit the polymer enhanced foam to function as diverting agents in the fractures at such significant distance from the well bore. Accordingly, the flow profile of a drive fluid subsequently injected into the formation will be improved.

Figure 3:
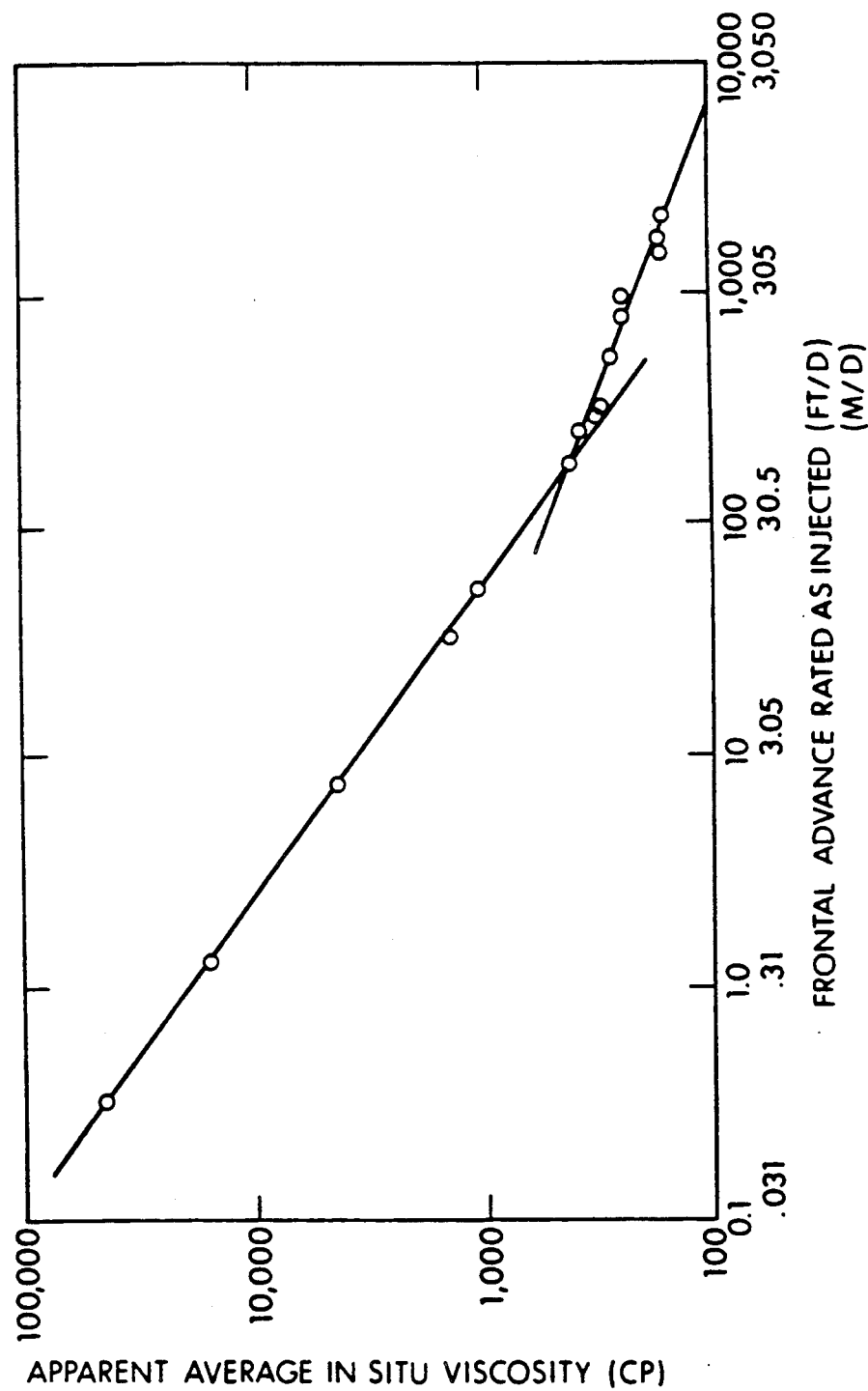
FIG. 3 is a logarithmic graph illustrating the average apparent in situ viscosity of a polymer enhanced foam utilized in the process of the present invention as a function of the frontal advance rate of the foam through a high permeability sandpack.

The results of FIG. 3 further illustrate that at high frontal advance rates corresponding to the subterranean environment near the well bore into which the polymer enhanced foam is injected, the apparent in situ viscosity of the polymer enhanced foam is relatively low, indicating that the polymer enhanced foam is readily injected into a fractured formation.

EXAMPLE 6

Two $CO_2$ huff n' puff field tests are performed in a mid-continent reservoir which has a subsurface depth of about 460 m. The reservoir is a highly fractured carbonate formation and has a reservoir temperature of 27° C. The $CO_2$ huff n' puff field tests are applied to two wells which are beginning to near their economic limit. The injected $CO_2$ gas is derived from liquid $CO_2$. During each huff n' puff $CO_2$ field test, 540 metric tons of $CO_2$ are injected over a three day period. Then each well is shut in for a 21 day soak period.

The first field test does not involve the injection of polymer enhanced foam prior to $CO_2$ injection. The well produces at 2.54 cubic meters per day prior to the $CO_2$ huff n' puff field test through 17.7 m of perforations which are open into the formation. Following the $CO_2$ huff n' puff treatment, the oil production rate from this well averages 3.66 cubic meters per day for the first 30 days of production.

The second field test is applied to a neighboring production well with a substantially identical well configuration and substantially identical reservoir properties, except only 16.2 m of perforations are open into the formation. The well produces 2.22 cubic meters per day prior to the $CO_2$ huff n' puff field test. The $CO_2$ huff n' puff field test is nearly identical, except polymer enhanced foam is injected in accordance with the process of the present invention just prior to $CO_2$ injection. The nitrogen polymer enhanced foam is injected in order to increase the differential pressure encountered within fractures during $CO_2$ injection, reduce the mobility of the injected $CO_2$, and divert $CO_2$ from very high permeability fracture conduits into matrix reservoir carbonate rock. The volume of polymer enhanced foam injected is 127 reservoir cubic meters. Foam quality of the polymer enhanced foam as injected into the reservoir varies between 81 and 87%. The aqueous phase of the polymer enhanced foam contains 6,500 ppm of a 7 to 10% hydrolyzed, 12,000,000 to 15,000,000 MW PHPA and 2,000 ppm $C_{12-14}$—C$\equiv$C—$SO_3$ Na alpha olefin sulfonate surfactant dissolved in produced water (10,300 ppm TDS, 520 ppm hardness, and high concentrations of sulfate and bicarbonate anions). Post-treatment production for the first thirty days for this second field test averages 7.47 cubic meters per day.

Oil production results of these two field tests suggest that the use of polymer enhanced foam can substantially improve the performance of $CO_2$ huff n' puff treatments and promote significant amounts of related incremental oil production by promoting more efficient use of the injected $CO_2$. This is believed to be accomplished by diverting $CO_2$ injection into the matrix oil-containing rock and by more effectively contacting liquid hydrocarbons with $CO_2$.

While the foregoing preferred embodiments of the invention have been described and shown, it is understood that the alternatives and modifications, such as those suggested and others, may be made thereto and fall within the scope of the invention.

I claim:

1. A process for recovering liquid hydrocarbons comprising:
   a) injecting into a fractured subterranean formation via a first well in fluid communication with the formation a polymer enhanced foam comprising a polymer selected from a synthetic polymer or a biopolymer, a surfactant, an aqueous solvent and a gas, said polymer enhanced foam preferentially entering and flowing within fractures present in the formation; and
   b) recovering liquid hydrocarbons from said formation via a second well in fluid communication with the formation.

2. The process of claim 1, further comprising:
   (c) injecting a drive fluid into said formation after said foam has entered said fractures.

3. The process of claim 2 wherein said foam breaks down within a predetermined period of time.

4. The process of claim 2 wherein said drive fluid is an aqueous drive fluid.

5. The process of claim 4 wherein said aqueous drive fluid imbibes from said fractures into the matrix of said formation thereby displacing liquid hydrocarbons from the matrix into said fractures, the process further comprising:
   d) repeating steps a) and b).

6. The process of claim 4 wherein said aqueous drive fluid imbibes from said fractures into the matrix of said formation thereby displacing liquid hydrocarbons from the matrix into said fractures, the process further comprising:
   d) injecting an aqueous drive fluid via said first well into said formation; and
   e) repeating step b).

7. The process of claim 2 wherein said drive fluid which is injected into the formation is diverted from said fractures into the matrix of said formation by said polymer enhanced foam thereby displacing liquid hydrocarbons present in the matrix.

8. The process of claim 7 wherein said drive fluid is a liquid selected from water, brine, an aqueous solution containing a polymer, an aqueous alkaline solution, an aqueous solution containing a surfactant, a micellar solution, or mixtures thereof.

9. The process of claim 7 wherein said drive fluid is a gas selected from carbon dioxide, steam, a hydrocarbon-containing gas, an inert gas, air or oxygen.

10. The process of claim 7 wherein said foam shear thickens as said foam is displaced within said fractures such that at a significant radial distance from said first well said shear thickened polymer foam thereby diverts said drive fluid from said fractures into said matrix.

11. The process of claim 10 wherein said drive fluid is an aqueous liquid, said shear thickened polymer foam serving to improve the flow profile of said aqueous liquid.

12. The process of claim 1 wherein the volume of the gas in said foam is from about 50 vol % to about 99.5 vol %.

13. The process of claim 12 wherein the volume of the gas in said foam is from about 60 vol % to about 98 vol %.

14. The process of claim 13 wherein the volume of the gas in said foam is from about 70 vol % to about 97 vol %.

15. The process of claim 1 wherein the polymer is a biopolymer selected from xanthan gum, guar gum, succinoglycan, scleroglucan, polyvinylsaccharides, carboxymethylcellulose, o-carboxychitosans, hydroxyethylcellulose, hydroxypropylcellulose, modified starches or mixtures thereof.

16. The process of claim 1 wherein the polymer is a synthetic polymer selected from polyacrylamide, partially hydrolyzed polyacrylamide, acrylamide copolymers, terpolymers containing acrylamide, a second species and a third species, tetrapolymers containing acrylamide, acrylate, and a third and fourth species, or mixtures thereof.

17. The process of claim 1 wherein the polymer concentration in said foam is from about 100 ppm to about 80,000 ppm.

18. The process of claim 17 wherein the polymer concentration in said foam is from about 500 ppm to about 12,000 ppm.

19. The process of claim 18 wherein the polymer concentration in said foam is from about 2,000 ppm to about 10,000 ppm.

20. The process of claim 1 wherein the surfactant is selected from ethoxylated alcohols, ethoxylated sulfates, refined sulfonates, petroleum sulfonates or alpha olefin sulfonates.

21. The process of claim 1 wherein the surfactant concentration in said foam is from about 20 ppm to about 50,000 ppm.

22. The process of claim 21 wherein the surfactant concentration in said foam is from about 50 ppm to about 20,000 ppm.

23. The process of claim 22 wherein the surfactant concentration in said foam is from about 100 ppm to about 10,000 ppm.

24. The process of claim 1 wherein said foam is injected into said fractured subterranean formation in a volume of about 0.3 to about 2,600 reservoir cubic meters per vertical meter of formation interval to be treated.

25. The process of claim 1 wherein said formation is a vertically fractured subterranean formation and wherein at least a portion of said recovered liquid hydrocarbons has been displaced from said fractures by said polymer enhanced foam.

26. The process of claim 25 wherein the viscosity ratio of said liquid hydrocarbons to water which is present in said formation is from about 2:1 to about 200:1.

27. The process of claim 25 wherein said foam is injected into said vertically fractured subterranean formation in a volume of about 0.3 to about 2,600 reservoir cubic meters per vertical meter of formation interval to be treated.

28. The process of claim 1 wherein said foam is formed at an earthen surface.

29. The process of claim 1 wherein said foam is formed within said first well.

30. The process of claim 1 wherein the fractures present in the formation are in fluid communication with an underlying aquifer.

31. A process for recovering liquid hydrocarbons comprising:
   a) injecting into a fractured subterranean formation via a well in fluid communication with said formation a polymer enhanced foam comprising a polymer selected from a synthetic polymer or a biopolymer, a surfactant, an aqueous solvent and a gas, said polymer enhanced foam preferentially entering and flowing within fractures present in the formation;
   b) injecting a fluid into said formation via said well after said foam has entered said fractures; and
   c) recovering liquid hydrocarbons from said formation via said well.

32. The process of claim 31 wherein said fluid is a liquid selected from water, brine, an aqueous solution containing a polymer, an aqueous alkaline solution, an aqueous solution containing a surfactant, a micellar solution, or mixtures thereof.

33. The process of claim 31 wherein said fluid is a gas selected from carbon dioxide, steam, a hydrocarbon-containing gas, an inert gas, air or oxygen.

34. The process of claim 31 further comprising: shutting in said first well for a predetermined period of time after step b) and before step c).

35. The process of claim 31 wherein the volume of the gas in said foam is from about 50 vol % to about 99.5 vol %.

36. The process of claim 35 wherein the volume of the gas in said foam is from about 60 vol % to about 98 vol %.

37. The process of claim 36 wherein the volume of the gas in said foam is from about 70 vol % to about 97 vol %.

38. The process of claim 31 wherein the polymer is a biopolymer selected from xanthan gum, guar gum, succinoglycan, scleroglucan, polyvinylsaccharides, carboxymethylcellulose, o-carboxychitosans, hydroxyethylcellulose, hydroxpropylcellulose, modified starches or mixtures thereof.

39. The process of claim 31 wherein the polymer is a synthetic polymer selected from polyacrylamide, partially hydrolyzed polyacrylamide, acrylamide copolymers, terpolymers containing acrylamide, a second species and a third species, tetrapolymers containing acrylamide, acrylate, and a third and fourth species, or mixtures thereof.

40. The process of claim 31 wherein the polymer concentration in said foam is from about 100 ppm to about 80,000 ppm.

41. The process of claim 40 wherein the polymer concentration in said foam is from about 500 ppm to about 12,000 ppm.

42. The process of claim 41 wherein the polymer concentration in said foam is from about 2,000 ppm to about 10,000 ppm.

43. The process of claim 31 wherein the surfactant is selected from ethoxylated alcohols, ethoxylated sulfates, refined sulfonates, petroleum sulfonates or alpha olefin sulfonates.

44. The process of claim 31 wherein the surfactant concentration in said foam is from about 20 ppm to about 50,000 ppm.

45. The process of claim 44 wherein the surfactant concentration in said foam is from about 50 ppm to about 20,000 ppm.

46. The process of claim 45 wherein the surfactant concentration in said foam is from about 100 ppm to about 10,000 ppm.

47. A process for recovering liquid hydrocarbons comprising:
   a) injecting into a fractured subterranean formation a polymer enhanced foam comprising a polymer selected from a synthetic polymer or a biopolymer, a surfactant, an aqueous solvent and a gas, said polymer enhanced foam preferentially entering and occupying at least a portion of the fractures present in the formation thereby functioning as a mobility control agent for improving the seep efficiency of liquid hydrocarbons from the formation; and
   b) recovering liquid hydrocarbons from said formation.

48. The process of claim 47 wherein the volume of the gas in said foam is from about 50 vol % to about 99.5 vol %.

49. The process of claim 48 wherein the volume of the gas in said foam is from about 60 vol % to about 98 vol %.

50. The process of claim 49 wherein the volume of the gas in said foam is from about 70 vol % to about 97 vol %.

51. The process of claim 47 wherein the polymer is a biopolymer selected from xanthan gum, guar gum, succinoglycan, scleroglucan, polyvinylsaccharides, carboxymethylcellulose, o-carboxychitosans, hydroxyethylcellulose, hydroxpropylcellulose, modified starches or mixtures thereof.

52. The process of claim 47 wherein the polymer is a synthetic polymer selected from polyacrylamide, partially hydrolyzed polyacrylamide, acrylamide copolymers, terpolymers containing acrylamide, a second species and a third species, tetrapolymers containing acrylamide, acrylate, and a third and fourth species, or mixtures thereof.

53. The process of claim 47 wherein the polymer concentration in said foam is from about 100 ppm to about 80,000 ppm.

54. The process of claim 53 wherein the polymer concentration in said foam is from about 500 ppm to about 12,000 ppm.

55. The process of claim 54 wherein the polymer concentration in said foam is from about 2,000 ppm to about 10,000 ppm.

56. The process of claim 47 wherein the surfactant is selected from ethoxylated alcohols, ethoxylated sulfates, refined sulfonates, petroleum sulfonates or alpha olefin sulfonates.

57. The process of claim 47 wherein the surfactant concentration in said foam is from about 20 ppm to about 50,000 ppm.

58. The process of claim 57 wherein the surfactant concentration in said foam is from about 50 ppm to about 20,000 ppm.

59. The process of claim 58 wherein the surfactant concentration in said foam is from about 100 ppm to about 10,000 ppm.

60. The process of claim 47 wherein said foam is injected into said fractured subterranean formation in a volume of about 0.3 to about 2,600 reservoir cubic meters per vertical meter of formation interval to be treated.

61. The process of claim 47 wherein said formation is a vertically fractured subterranean formation and wherein at least a portion of said recovered liquid hydrocarbons has been displaced from said fractures by said polymer enhanced foam.

62. The process of claim 61 wherein the viscosity ratio of said liquid hydrocarbons to water which is present in said formation is from about 2:1 to about 200:1.

63. The process of claim 61 wherein said foam is injected into said vertically fractured subterranean formation in a volume of about 0.3 to about 2,600 reservoir cubic meters per vertical meter of formation interval to be treated.

64. The process of claim 47 wherein said foam is formed at an earthen surface.

65. The process of claim 47 wherein said foam is formed within a well via which said foam is injected into said fractured subterranean formation.

66. The process of claim 47 wherein the fractures present in the formation are in fluid communication with an underlying aquifer.

* * * * *